J. S. KENDIG.
PLANTER AND FERTILIZER DISTRIBUTER.
APPLICATION FILED NOV. 21, 1912.
1,069,016.
Patented July 29, 1913.
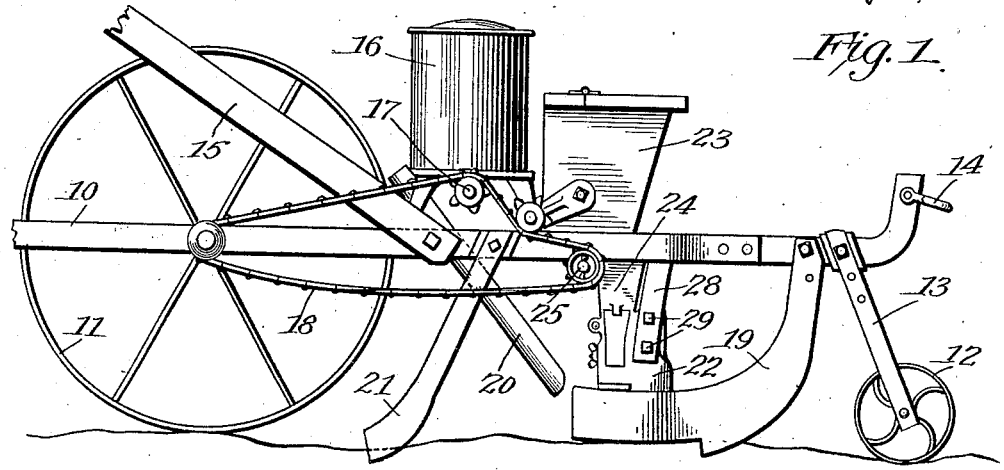
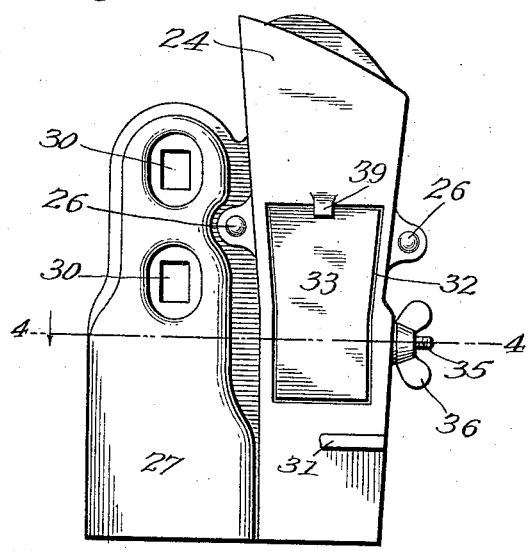
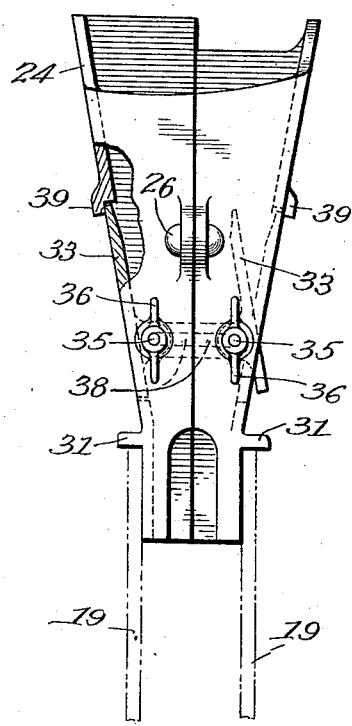
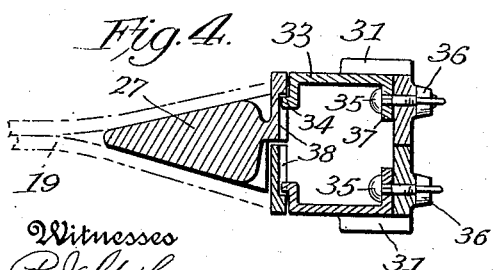
Witnesses
P. J. Gathmann
B. M. Kent
Inventor
Jacob S. Kendig
By Foster, Freeman, Watson & Coit,
Attorneys
COLUMBIA PLANOGRAPH CO., WASHINGTON, D. C.

UNITED STATES PATENT OFFICE.

JACOB SAYLOR KENDIG, OF YORK, PENNSYLVANIA, ASSIGNOR TO KEYSTONE FARM MACHINE COMPANY, OF YORK, PENNSYLVANIA, A CORPORATION OF PENNSYLVANIA.

PLANTER AND FERTILIZER-DISTRIBUTER.

1,069,016.        Specification of Letters Patent.        Patented July 29, 1913.

Application filed November 21, 1912. Serial No. 732,752.

*To all whom it may concern:*

Be it known that I, JACOB SAYLOR KENDIG, a citizen of the United States, residing at York, county of York, State of Pennsylvania, have invented certain new and useful Improvements in Planters and Fertilizer-Distributers, of which the following is a specification.

This invention relates to agricultural machines and more particularly to machines for planting seeds and distributing fertilizer.

In connection with seed-planting machines it is frequently desirable to distribute fertilizer either in the row with the seeds or at one or both sides thereof, and the object of my invention is to provide a device for accomplishing such distribution of the fertilizer.

In the accompanying drawings I have shown one form of the invention in which the fertilizer distributer is applied to a corn planter of a well known type.

In the drawings: Figure 1 is a side elevation of the corn planter. Fig. 2 is an enlarged side elevation of the fertilizer distributer. Fig. 3 is an end elevation of the same with a portion of the casing broken away. Fig. 4 is a section on the line 4—4 of Fig. 2.

Referring to the drawings 10 indicates the frame of the planter which is supported on the wheels 11 and 12, the latter being carried by an adjustable bracket 13 and determining the depth to which the seeds are planted. At the forward end of the frame is a suitable link or clevis 14, to which a whiffletree may be attached. The frame 10 is also provided with the handles 15, by means of which the machine may be guided, and the seed receptacle 16 having any well known feeding mechanism operated by a shaft 17, which shaft is driven from the wheel 11 by means of a suitable chain 18.

A plow 19 is arranged at the forward end of the machine and engages the ground for the purpose of making a furrow for the seeds which are conveyed from the receptacle 16 to the ground by means of a chute 20. Arranged rearwardly of the delivery end of the chute 20 is a pair of coverers 21 for the purpose of throwing the soil back into the furrow to cover the seed. The plow 19 comprises a pair of wings which are spaced at their rearward end and have arranged therebetween a fertilizer distributer 22, which is connected with the fertilizer hopper or receptacle 23 by means of a suitable chute 24. Any suitable means may be employed for feeding the fertilizer from the hopper 23 to the chute 24, this means being driven by a shaft 25, which is also operated by the chain 18.

The fertilizer distributer 22 comprises a pair of castings which are bolted or riveted together by means of suitable bolts 26, these castings coöperating to form the chute 24 and one of the castings having a forwardly extending plow-shaped portion 27 which is arranged between the wings of the plow 19 and to which is secured a suitable support 28 by means of bolts 29 which pass through openings 30 in the extension 27. The sides of the chute 24 are provided with lugs 31 which engage the upper edge of the wings of the plow 19 and assist in supporting the distributer. The sides of the chute are also provided with openings 32, in which are arranged suitable gates 33, these gates being pivoted to the chute by means of a lug 34 on one side and a bolt 35 on the other side, this bolt being provided on the exterior of the chute with a clamping nut 36. As will be seen from Fig. 4 the bolt 35 is preferably provided with a square shank, under its head, which engages a square opening in the lug 37 on the gate, to prevent the bolt from turning relative to the gate. The lug 34 is preferably formed integral with the gate 33 and, in order to provide a simple construction, grooves 38 are provided on the interior of the castings forming the chute 24, these grooves being formed in the castings and permitting the gate to be placed in position before the castings are bolted together.

As will be seen from Figs. 2 and 3 the pivots of the gates 33 are near the lower ends thereof and the castings forming the chute 24 are provided at the upper ends of the openings 32 with lugs 39 adapted to engage the upper edges of the gates 33 and limit the outward swinging of the gates.

From Fig. 3 it will be readily understood that the gates 33 may be secured in various positions to provide for any desired distribution of the fertilizer. For example, both gates may be closed and thereby cause all of the fertilizer to fall directly through the chute 24 into the row with the seeds, or both gates may be swung to the position shown in dotted lines to distribute some of the fertilizer in the row and the remainder on both sides of the row. One of the gates may be closed and the other swung to a position in which its upper edge is in contact with the inner sides of the first gate to throw all of the fertilizer to one side of the row. The gates may also be arranged so as to distribute all of the fertilizer through the openings in the sides with any desired proportion through one opening and the remainder through the other opening. In this case the gates coöperate to form an upwardly pointed V-shaped deflector, the point of which is movable transversely of the chute to effect the desired distribution.

The gates 33 may be clamped in position by means of nuts 36 and when these nuts are loosened the gates may be readily swung to any position desired.

Having thus described the invention what is claimed as new is:

1. In a machine of the class described, a fertilizer distributer comprising a chute having openings in the opposite sides thereof, a pair of gates pivotally arranged in said chute and adapted to close said openings, and means whereby said gates can be secured in position to close said openings or to distribute all or part of the fertilizer through either or both of said openings.

2. In a machine of the class described, the combination of a seed distributer and a fertilizer distributer, said fertilizer distributer comprising a chute having a plurality of openings in the side walls thereof, gates pivotally mounted in said chute and adapted to close said openings, and means whereby said gates may be clamped in position to close said openings or to cause the fertilizer passing through the chute to be distributed through either or both of said openings.

3. In a machine of the class described, the combination of a seed distributer, a furrowing plow and a fertilizer distributer comprising a hopper and a chute for conveying the fertilizer from the hopper, said chute having a plurality of openings in its side walls above said furrowing plow, and gates pivotally mounted in said openings and adapted to cause the fertilizer passing through the chute to be distributed in the rear of the plow or on either or both sides thereof.

4. In a machine of the class described, the combination of a frame, a seed distributer mounted thereon, a furrowing plow secured to the forward end of the frame and comprising a pair of diverging wings, a fertilizer distributer comprising a hopper supported on said frame, and a chute extending from said hopper to a point between said wings, said chute being provided in its side walls above said wings with openings, gates pivoted in said openings, and means whereby said gates may be adjusted to distribute the fertilizer, passing through said chute, between said wings or on either or both sides of the plow.

5. In a machine of the class described, a fertilizer distributer comprising a pair of members coöperating to form a chute and having openings in their side walls, and gates pivoted in said openings, each of said gates having a pivot formed integral therewith and a bolt arranged in alinement with said pivot and extending through a wall of one of said members and provided on the exterior thereof with means for clamping the gate in different positions.

6. In a machine of the class described, a fertilizer distributer comprising a chute having openings in its sides, and upwardly pointed V-shaped deflecting means movable within said chute for distributing all of the fertilizer through one or more of said openings and for regulating the quantity discharged through each opening.

In testimony whereof I affix my signature in presence of two witnesses.

JACOB SAYLOR KENDIG.

Witnesses:
C. E. PEIFFER,
M. S. VILES.